United States Patent
Brushwood

(10) Patent No.: US 9,915,358 B2
(45) Date of Patent: Mar. 13, 2018

(54) VALVE

(71) Applicant: Ellcon National, Inc., Greenville, SC (US)

(72) Inventor: Daniel Brushwood, Easley, SC (US)

(73) Assignee: AMSTED RAIL COMPANY, INC., Chicago, IL (US)

( * ) Notice: Subject to any disclaimer, the term of this patent is extended or adjusted under 35 U.S.C. 154(b) by 773 days.

(21) Appl. No.: 13/760,653

(22) Filed: Feb. 6, 2013

(65) Prior Publication Data

US 2014/0217319 A1   Aug. 7, 2014

(51) Int. Cl.
*F16K 35/04* (2006.01)
*F16K 5/06* (2006.01)
*F16K 31/60* (2006.01)
*F16K 35/02* (2006.01)

(52) U.S. Cl.
CPC .......... *F16K 5/0647* (2013.01); *F16K 31/602* (2013.01); *F16K 35/027* (2013.01); *F16K 35/04* (2013.01)

(58) Field of Classification Search
CPC ...... F16K 31/60; F16K 31/602; F16K 35/027; F16K 35/04; F16K 5/027
USPC ....... 251/96, 95, 98, 99, 231, 243, 251, 262, 251/263, 253
See application file for complete search history.

(56) References Cited

U.S. PATENT DOCUMENTS

| | | | |
|---|---|---|---|
| 93,222 A * | 8/1869 | Palmer et al. .... | F16K 31/52408 251/253 |
| 1,131,224 A * | 3/1915 | Ellwood ............... | F16K 31/602 251/99 |
| 1,196,587 A * | 8/1916 | Robinson ......................... | 251/98 |
| 1,509,816 A * | 9/1924 | Kendrick .............. | B60T 17/043 251/99 |
| 1,697,278 A * | 1/1929 | Kendrick ......................... | 251/99 |
| 2,512,052 A * | 6/1950 | Brown ........................... | 251/98 |
| 2,626,123 A * | 1/1953 | Daniels ..................... | 137/625.31 |
| 3,858,843 A * | 1/1975 | Hartmann ....................... | 251/99 |
| 4,004,601 A | 1/1977 | Bachelder et al. | |
| 4,078,763 A * | 3/1978 | Yamamoto ...................... | 251/96 |
| 4,397,445 A * | 8/1983 | Burquier .................... | 251/149.9 |
| 4,456,219 A * | 6/1984 | Scott ..................... | F16K 31/602 16/438 |
| 4,568,059 A * | 2/1986 | Kawase et al. ................. | 251/99 |
| 5,275,200 A * | 1/1994 | Yamamoto .................... | 137/377 |
| 8,100,383 B2 * | 1/2012 | Chou .................... | F16K 5/0647 251/214 |
| 8,944,404 B2 * | 2/2015 | Giacomini ..................... | 251/96 |

\* cited by examiner

*Primary Examiner* — John K Fristoe, Jr.
*Assistant Examiner* — Andrew J Rost
(74) *Attorney, Agent, or Firm* — Dority & Manning, P.A.

(57) ABSTRACT

A valve includes a valve body and a handle operably connected to the valve body. The handle has a shut position that prevents fluid flow through the valve body and an open position that permits fluid flow through the valve body. A shut detent is configured to engage with the handle in the shut position, and the valve further includes structure for biasing the handle toward the open position.

5 Claims, 3 Drawing Sheets

VALVE

FIELD OF THE INVENTION

The present invention relates generally to a valve, such as may be incorporated into a fluid system for isolating fluid flow through the system.

BACKGROUND OF THE INVENTION

Pneumatic and hydraulic systems commonly include valves to alternately permit or prevent fluid flow. For example, some valves may be normally open to permit fluid flow through the valves, while other valves may be normally shut to prevent fluid flow through the valves. In some fluid systems, the accurate position of one or more valves may be necessary to ensure the safe operation of the fluid system. For example, one or more valves may be intentionally or inadvertently repositioned during maintenance or other temporary operations, and the accurate repositioning of the valves may be necessary to ensure safe operation of the fluid system when the maintenance or temporary operations are complete.

As a specific example, modern trains often include air-operated brakes for each railcar. Pipe segments supply compressed air to each railcar along the length of the train, and each pipe segment includes an isolation valve at each end to alternately permit or prevent airflow through the pipe segment. The isolation valve is normally open when the railcar is in service to allow the compressed air to freely flow to each railcar in the train. Conversely, the isolation valve is normally shut when the railcar is taken out of service to prevent debris from entering the pipe segments.

Accidental or inadvertent repositioning of the isolation valve may prevent the air-operated brakes from working properly. For example, an isolation valve that is accidentally or inadvertently shut will prevent compressed air from being supplied to any railcars downstream from the shut isolation valve. Conversely, an isolation valve that is accidentally or inadvertently opened may allow debris to foul the pipe segment. As a result, a valve having additional safety features to lock the position of the valve and/or bias the valve to a particular position would be useful.

BRIEF DESCRIPTION OF THE INVENTION

Aspects and advantages of the invention are set forth below in the following description, or may be obvious from the description, or may be learned through practice of the invention.

One embodiment of the present invention is a valve that includes a valve body and a handle operably connected to the valve body. The handle has a shut position that prevents fluid flow through the valve body and an open position that permits fluid flow through the valve body. A shut detent is configured to engage with the handle in the shut position, and the valve further includes means for biasing the handle toward the open position.

Another embodiment of the present invention is a valve that includes a valve body and a handle operably connected to the valve body. The handle has a shut position that prevents fluid flow through the valve body and an open position that permits fluid flow through the valve body. A shut detent is configured to engage with the handle in the shut position, and a spring is operably connected to the handle, wherein the spring biases the handle toward the open position.

In yet another embodiment of the present invention, a valve includes a valve body and a handle operably connected to the valve body. The handle has a shut position that prevents fluid flow through the valve body and an open position that permits fluid flow through the valve body. A sloped surface is defined by the valve body, and the handle is biased against the sloped surface when the handle is not in the shut position.

Those of ordinary skill in the art will better appreciate the features and aspects of such embodiments, and others, upon review of the specification.

BRIEF DESCRIPTION OF THE DRAWINGS

A full and enabling disclosure of the present invention, including the best mode thereof to one skilled in the art, is set forth more particularly in the remainder of the specification, including reference to the accompanying figures, in which.

DETAILED DESCRIPTION OF THE INVENTION

Figure 1:
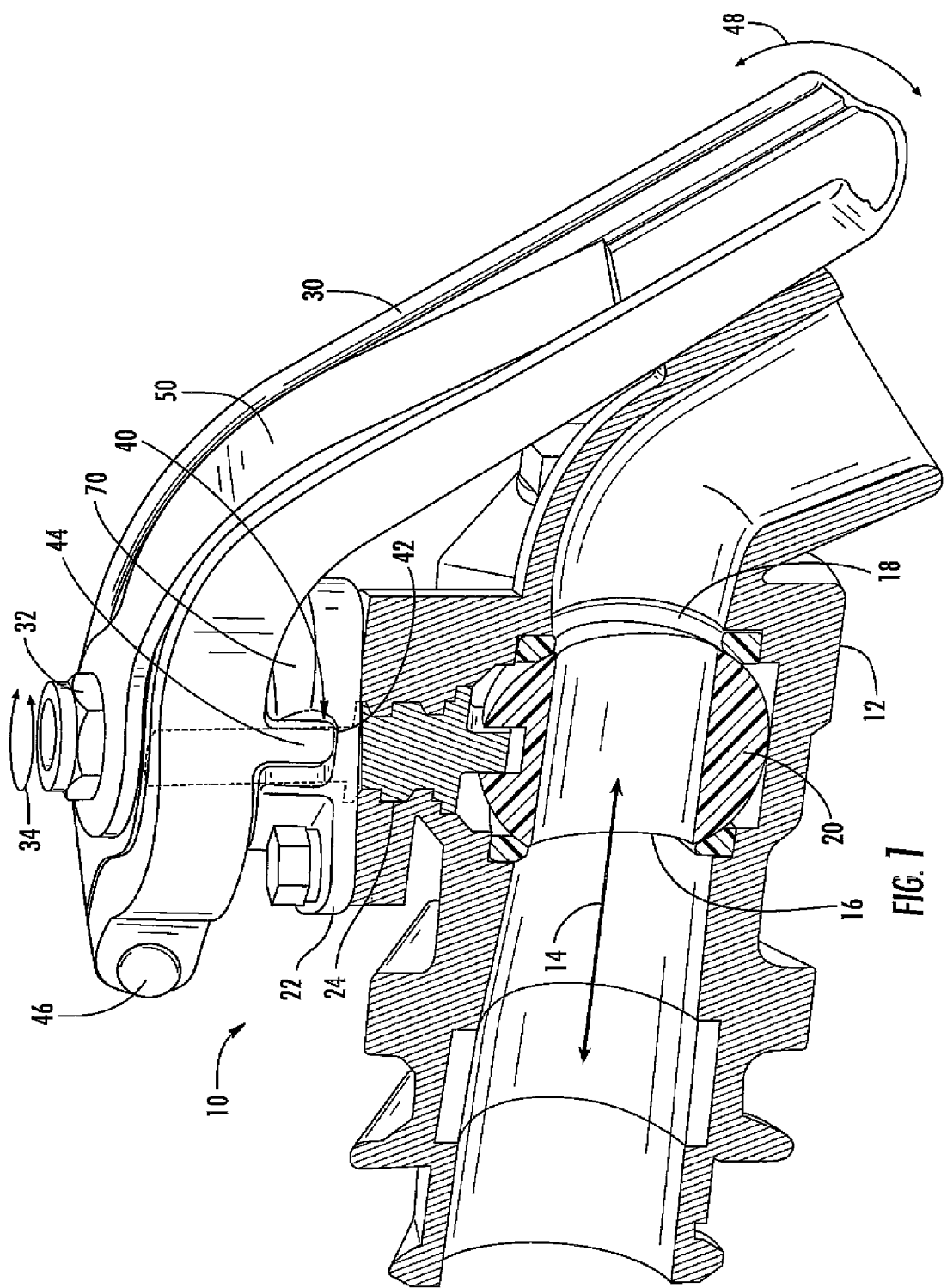
FIG. 1 is a side perspective, partial cross-section view of a valve in a locked open position according to one embodiment of the present invention.

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention. As used herein, the terms "first", "second", and "third" may be used interchangeably to distinguish one component from another and are not intended to signify location or importance of the individual components. The terms "upstream," "downstream," "radially," and "axially" refer to the relative direction with respect to fluid flow in a fluid pathway. For example, "upstream" refers to the direction from which the fluid flows, and "downstream" refers to the direction to which the fluid flows. Similarly, "radially" refers to the relative direction substantially perpendicular to the fluid flow, and "axially" refers to the relative direction substantially parallel to the fluid flow.

Each example is provided by way of explanation of the invention, not limitation of the invention. In fact, it will be apparent to those skilled in the art that modifications and variations can be made in the present invention without departing from the scope or spirit thereof. For instance, features illustrated or described as part of one embodiment may be used on another embodiment to yield a still further embodiment. Thus, it is intended that the present invention covers such modifications and variations as come within the scope of the appended claims and their equivalents.

Various embodiments of the present invention include a valve that may be incorporated, for example, into a fluid system to alternately permit or prevent fluid flow in the fluid system. The valve generally includes a valve member inside a valve body, and a stein may extend through the valve body to connect the valve member to a handle for operation or positioning of the valve member inside the valve body. In this manner, the handle may have a shut position that prevents fluid flow through the valve body and an open position that permits fluid flow through the valve body. In particular embodiments, the valve may further include open and/or shut detents configured to engage with the handle in the open and/or shut positions, respectively. Alternately or in addition, the valve may further include a spring or other means for biasing the handle toward the open or shut positions to prevent the valve from being accidentally or inadvertently repositioned.

Referring now to the drawings, wherein identical numerals indicate the same elements throughout the figures, FIG. 1 provides a side perspective, partial cross-section view of a valve 10 in a locked open position according to one embodiment of the present invention. The valve 10 generally includes a valve body 12 that defines a fluid pathway 14 through the valve 10. For example, as shown in FIG. 1, the valve body 12 may define an inlet 16 and an outlet 18. A valve member 20 inside the valve body 12 may have multiple positions to alternately permit or prevent fluid flow through the fluid pathway 14. The valve member 20 may be a disc, ball, globe, or other structure known to one of ordinary skill in the art.

In the particular embodiment shown in FIG. 1, the valve body 12 includes a bonnet 22, and a stem 24 passes through the bonnet 22 to connect the valve member 20 to a handle 30. A bolt 32 may connect the handle 30 to the bonnet 22 and stein 24 so that the handle 30 may rotate with respect to the valve body 12 along a first plane 34 to rotate the valve member 20. In this manner, the handle 30 may be operably connected to the valve body 12 to rotate the valve member 20 to the open position to permit fluid flow through the valve body 12.

The valve 10 may further include an open detent 40 configured to engage with the handle 30 in the open position. The open detent 40 may be a socket, pawl, latch, indention, projection, pin, or other structure known to one of ordinary skill in the art for resisting or arresting movement between two components. In the particular embodiment shown in FIG. 1, the open detent 40 is a recess 42 defined by the valve body 12 or bonnet 22, and the handle 30 further defines a complementary projection 44 configured to engage with the recess 42 when the handle 30 is in the open position. The handle 30 may further connect to a pivot 46 that allows the handle 30 to pivot with respect to the valve body 12 along a second plane 48 that is substantially perpendicular to the first plane 34. A leaf spring 50 connected by the bolt 32 to the handle 30 may apply continuous force against the handle 30 along the second plane 48 to enhance engagement between the projection 44 and the recess 42 when the handle is in the open position. When desired, the handle 30 may be lifted or pivoted along the second plane 48 to disengage the projection 44 from the recess 42 before rotating the handle 30 along the first plane 34 to reposition the valve 10. In this manner, the recess 42, projection 44, and/or leaf spring 50 combine to more securely hold the handle 30 in the open position, reducing the chance that the valve 10 may be accidentally or inadvertently repositioned.

Figure 2:
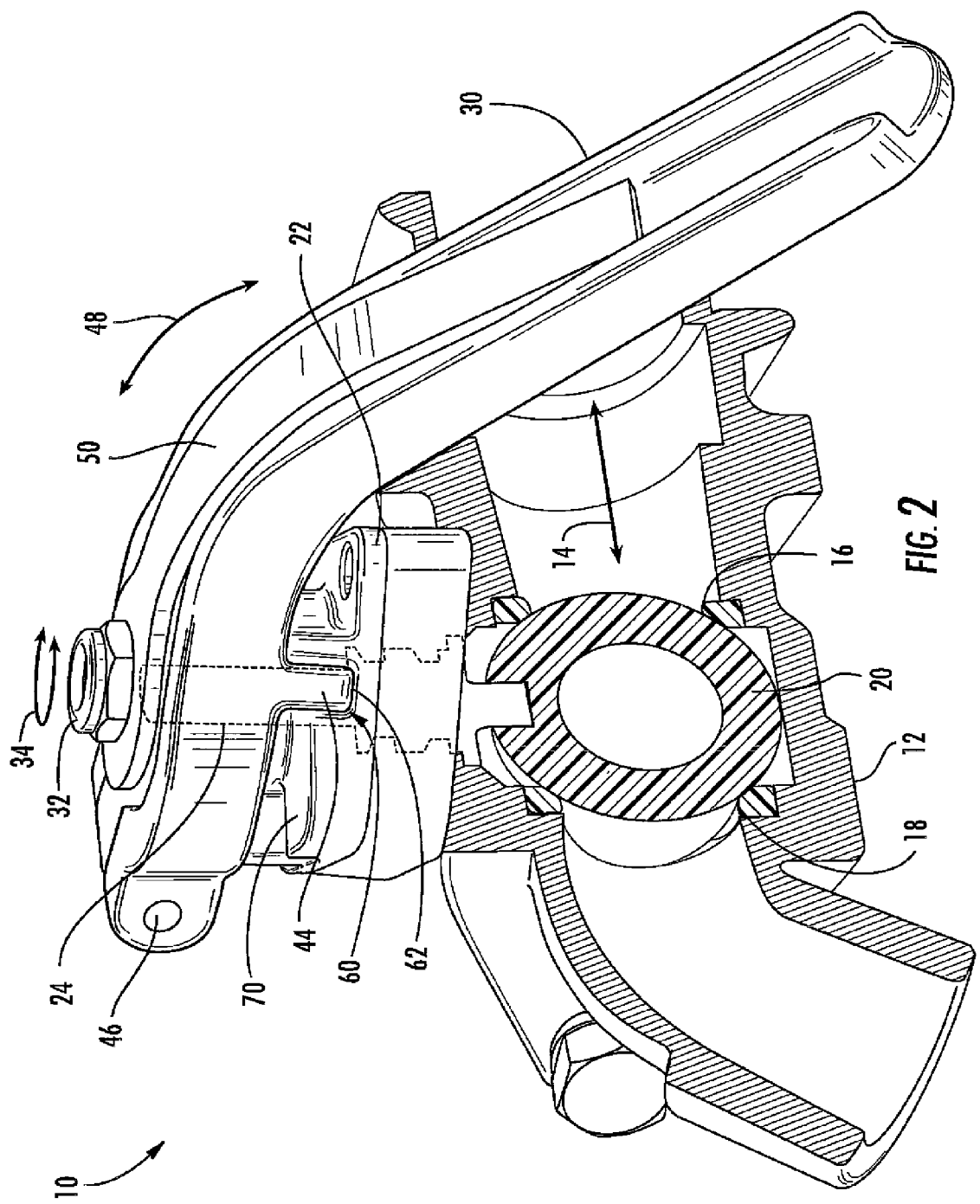
FIG. 2 is a side perspective, partial cross-section view of the valve shown in FIG. 1 in a locked shut position.

FIG. 2 provides a side perspective, partial cross-section view of the valve 10 shown in FIG. 1 in a locked shut position. As shown in FIG. 2, the handle 30 has been rotated approximately 90 degrees counter-clockwise with respect to the valve body 12 along the first plane 34 to rotate the valve member 20 to the shut position to prevent fluid flow through the valve body 12. The valve 10 may further include a shut detent 60 configured to engage with the handle 30 in the shut position. The shut detent 60 may be a socket, pawl, latch, indention, projection, pin, or other structure known to one of ordinary skill in the art for resisting or arresting movement between two components. In the particular embodiment shown in FIG. 2, the shut detent 60 is again a recess 62 defined by the valve body 12 or bonnet 22, and the complementary projection 44 defined by the handle 30 again engages with the recess 62 when the handle 30 is in the shut position. When desired, the handle 30 may be lifted or pivoted along the second plane 48 to disengage the projection 44 from the recess 62 before rotating the handle 30 along the first plane 34 to reposition the valve 10. In this manner, the recess 62, projection 44, and/or leaf spring 50 combine to more securely hold the handle 30 in the shut position, reducing the chance that the valve 10 may be accidentally or inadvertently repositioned.

Figure 3:
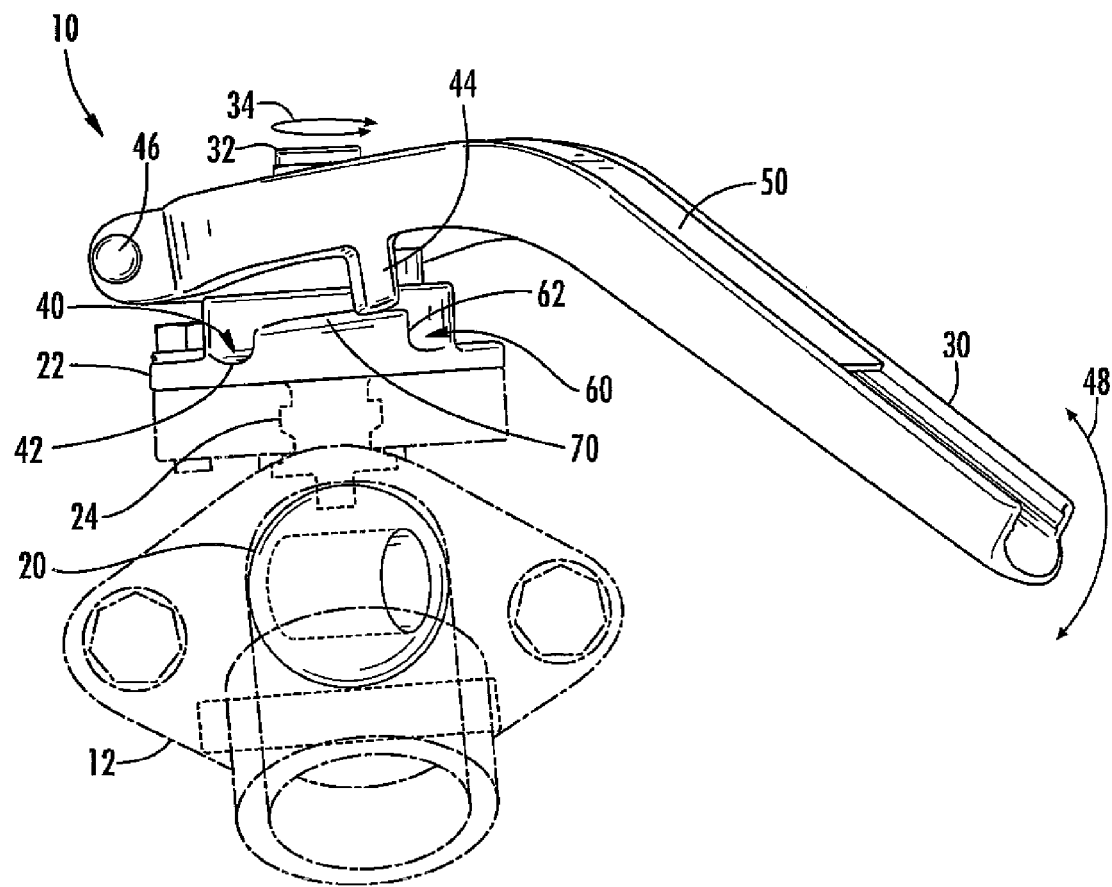
FIG. 3 is an axial perspective view of the valve shown in FIG. 1 in an intermediate position.

FIG. 3 provides an axial perspective view of the valve 10 shown in FIG. 1 in an intermediate position. The intermediate position includes any position other than the locked open position shown in FIG. 1 or the locked shut position shown in FIG. 2. The intermediate position may be the result of the valve 10 being accidentally or inadvertently bumped or repositioned from one of the locked positions shown in FIGS. 1 and 2.

The valve 10 may further include various means for biasing the handle 30 toward the open or shut positions. In the particular embodiment shown in FIG. 3, the valve 10 includes means for biasing the handle 30 toward the open position shown in FIG. 1. The structure associated with the means for biasing the handle 30 toward the open position may include a spring or other biasing member operably connected to the handle 30 to bias the handle 30 toward the open position. Alternately, as shown in FIG. 3, the structure may include the leaf spring 50 previously described with respect to FIGS. 1 and 2 in combination with a sloped surface 70 between the open and shut detents 40, 60. In particular embodiments, the valve body 12 and/or bonnet 22 may define the sloped surface 70, as shown in FIGS. 1-3. In this manner, the leaf spring 50 may bias the handle 30 against the sloped surface 70 when the handle is not in the shut detent 60, and the force of the handle 30 against the sloped surface 70 may cause the handle 30 to rotate clockwise with respect to the valve body 12 along the first plane 34, thereby rotating the valve member 20 to the open position to ensure fluid flow through the valve body 12.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

What is claimed is:
1. A valve comprising:
  a. a valve body, wherein the valve body defines a straight pathway from an inlet to an outlet;
  b. a valve stem that passes through the valve body;
  c. a handle operably connected to the valve stem, wherein the handle has a shut position that prevents fluid flow from the inlet through the valve body to the outlet and an open position that permits fluid flow from the inlet through the valve body to the outlet;

d. a shut detent configured to engage with the handle in the shut position and hold the handle in the shut position; and e. means for biasing the handle toward the open position, wherein the handle rotates with respect to the valve body along a first plane and pivots with respect to the valve body along a second plane substantially perpendicular to the first plane, and the means for biasing the handle toward the open position is a leaf spring directly connected to the valve stem and to apply force to the handle along the second plane in a recess in the handle.

2. The valve as in claim 1, wherein the valve body defines the shut detent.

3. The valve as in claim 1, further comprising an open detent configured to engage with the handle in the open position and hold the handle in the open position.

4. The valve as in claim 1, wherein the valve body defines a sloped surface next to the shut detent, wherein the means for biasing the handle toward the open position biases the handle against the sloped surface when the handle is not engaged with the shut detent.

5. The valve as in claim 1, wherein the handle defines a projection configured to engage with the shut detent when the handle is in the shut position.

* * * * *